(12) United States Patent
Jeon et al.

(10) Patent No.: US 10,180,595 B2
(45) Date of Patent: Jan. 15, 2019

(54) DISPLAY APPARATUS

(71) Applicant: SAMSUNG ELECTRONICS CO., LTD., Suwon-si (KR)

(72) Inventors: Tae Hee Jeon, Seoul (KR); Dae Young Kim, Hwaseong-si (KR); Jong Bin Kim, Suwon-si (KR); Gong Hee Lee, Seoul (KR); Sang-Eun Lee, Seoul (KR); Jae Hak Cho, Hwaseong-si (KR); Jean Hur, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/331,210

(22) Filed: Oct. 21, 2016

(65) Prior Publication Data
US 2017/0184918 A1    Jun. 29, 2017

Related U.S. Application Data

(60) Provisional application No. 62/387,182, filed on Dec. 23, 2015.

(30) Foreign Application Priority Data

Feb. 29, 2016    (KR) ......................... 10-2016-0024246

(51) Int. Cl.
G02F 1/1333        (2006.01)
G02F 1/1335        (2006.01)

(52) U.S. Cl.
CPC .. *G02F 1/133605* (2013.01); *G02F 1/133308* (2013.01); *G02F 1/133603* (2013.01);
(Continued)

(58) Field of Classification Search
CPC ......... G02F 1/133603; G02F 1/133605; G02F 1/133606; G02F 1/133608; G02F 1/133609; G02F 2001/133607
See application file for complete search history.

(56) References Cited

U.S. PATENT DOCUMENTS

| 5,453,855 A * | 9/1995 | Nakamura ........... G02B 6/0051 349/58 |
| 2007/0171676 A1* | 7/2007 | Chang .................. G02B 6/0046 362/613 |

(Continued)

FOREIGN PATENT DOCUMENTS

| CN | 102778047 A | 11/2012 |
| EP | 0 778 477 A1 | 6/1997 |

(Continued)

OTHER PUBLICATIONS

Communication dated May 4, 2017 by the European Patent Office in counterpart European Patent Application No. 16193729.7.

(Continued)

*Primary Examiner* — Alexander K Garlen
(74) *Attorney, Agent, or Firm* — Sughrue Mion, PLLC

(57) ABSTRACT

Provided is a display apparatus. The display apparatus includes a display panel, a light source configured to generate light to be supplied to the display panel, and a reflecting member disposed behind the display panel and formed of a white foam resin to diffuse and reflect light generated from the light source.

19 Claims, 8 Drawing Sheets

(52) U.S. Cl.
CPC .. *G02F 1/133606* (2013.01); *G02F 1/133608* (2013.01); *G02F 1/133615* (2013.01); *G02F 2001/133317* (2013.01); *G02F 2001/133607* (2013.01)

(56) References Cited

U.S. PATENT DOCUMENTS

| | | | |
|---|---|---|---|
| 2008/0170412 A1 | 7/2008 | Ohno | |
| 2008/0186431 A1 | 8/2008 | Imojo et al. | |
| 2010/0172152 A1* | 7/2010 | Boonekamp | F21V 7/0008 362/609 |
| 2011/0002682 A1* | 1/2011 | Messina | F21V 7/0008 396/200 |
| 2011/0211335 A1* | 9/2011 | Ko | G02B 6/0046 362/97.1 |
| 2011/0222267 A1* | 9/2011 | Park | G02F 1/133615 362/97.1 |
| 2012/0169945 A1* | 7/2012 | Kuromizu | G02B 5/0263 348/790 |
| 2013/0242541 A1* | 9/2013 | Kim | F21V 7/00 362/97.1 |
| 2013/0335962 A1* | 12/2013 | Wu | F21V 5/004 362/235 |
| 2014/0146521 A1* | 5/2014 | Kim | G02F 1/133605 362/97.1 |
| 2014/0192557 A1 | 7/2014 | Lu et al. | |
| 2014/0211121 A1 | 7/2014 | Cho et al. | |
| 2015/0009653 A1 | 1/2015 | Dunn et al. | |
| 2015/0103288 A1 | 4/2015 | Lee et al. | |
| 2016/0084474 A1* | 3/2016 | Ohno | F21V 7/0041 362/235 |

FOREIGN PATENT DOCUMENTS

| | | |
|---|---|---|
| EP | 1 553 431 A1 | 7/2005 |
| JP | 2006-339136 A | 12/2006 |
| JP | 2010-145908 A | 7/2010 |
| JP | 2015-138151 A | 7/2015 |
| KR | 2003-0025832 A | 3/2003 |
| KR | 10-2011-0071038 A | 6/2011 |
| KR | 10-2013-0030440 A | 3/2013 |

OTHER PUBLICATIONS

Communication dated Jan. 26, 2017 issued by the International Searching Authority in counterpart International Patent Application PCT/KR2016/011968 (PCT/ISA/210).

* cited by examiner

DISPLAY APPARATUS

CROSS-REFERENCE TO RELATED APPLICATIONS

This application claims the benefit of U.S. Provisional Patent Application No. 62/387,182, filed on Dec. 23, 2015 in the U.S. Patent and Trademark Office, and Korean Patent Application No. 10-2016-0024246, filed on Feb. 29, 2016 in the Korean Intellectual Property Office, the disclosure of which are incorporated herein by reference in their entireties.

BACKGROUND

1. Field

Apparatuses consistent with exemplary embodiments relate to a display apparatus having a reflecting member which reflects light generated from a light source to a display panel.

2. Description of the Related Art

A display apparatus displaying an image may include monitors, televisions, etc.

There are display apparatuses including a display panel comprising a liquid crystal panel. Since the display panel comprising the liquid crystal panel cannot emit light by itself, the display apparatus should include a backlight to supply light to the display panel.

A backlight includes a light source which generates light to be supplied to a display panel and a reflecting member which reflects the light generated from the light source.

Among display apparatuses, there are display apparatuses in which a printed circuit board and light emitting diodes disposed on the printed circuit board are used as a light source.

SUMMARY

One or more exemplary embodiments provide a display apparatus having a reflecting member to diffuse light more broadly.

According to an aspect of an exemplary embodiment, there is provided a display apparatus including a display panel, a light source configured to generate light to be supplied to the display panel, and a reflecting member disposed behind the display panel and formed of a white foam resin to diffuse and reflect light generated from the light source.

The light source may radiate light toward a rear side in an inclined manner, and the reflecting member may include a reflecting groove which is concavely provided on a front surface of the reflecting member to reflect light.

The light source may include a printed circuit board which has a bar shape and is disposed lengthwise in a horizontal direction at a rear side of a lower portion of the display panel, and a plurality of light emitting diodes disposed on the printed circuit board.

The reflecting groove may include a first reflecting surface which extends toward an upper front side around the printed circuit board in an inclined manner, and a pair of second reflecting surfaces which are provided on both sides around the printed circuit board and extend in front of both side ends in an inclined manner.

The display apparatus may further include a light absorbing part which is provided on the pair of the second reflecting surfaces and absorbs a portion of light generated from the light emitting diodes.

The light absorbing part may include a plurality of grooves concavely formed as depressions in each of the pair of the second reflecting surfaces.

The plurality of grooves may gradually become smaller in size from a region adjacent to a side end of the printed circuit board toward a region spaced apart from the printed circuit board.

The light absorbing part may include a plurality of black dots provided on the pair of the second reflecting surfaces.

The plurality of black dots may gradually become smaller in size from a region adjacent to a side end of the printed circuit board toward a region spaced apart from the printed circuit board.

The display apparatus may further include a middle mold configured to support an outer perimeter of the display panel, a top chassis combined with a front side of the middle mold, and a bottom chassis combined with a rear side of the middle mold, wherein the reflecting member is disposed inside the bottom chassis.

The display apparatus may further include a middle mold configured to support an outer perimeter of the display panel, and a top chassis combined with a front side of the middle mold, wherein the reflecting member forms a bottom chassis to be combined with a rear side of the middle mold.

The light source may further include a reflector which reflects light generated from the light emitting diodes, and the reflector extends toward an upper rear side of the light emitting diodes in an inclined manner.

The reflector may extend in an arcuate shape.

According to another aspect of an exemplary embodiment, there is provided a display apparatus including a display panel, a light source configured to generate light to be supplied to the display panel, and a bottom chassis which accommodates the light source and comprises a white foam resin.

The light source may include a printed circuit board, and a plurality of light emitting diodes disposed on the printed circuit board.

The printed circuit board is formed in a bar shape and disposed lengthwise in a horizontal direction at a rear side of a lower portion of the display panel, the bottom chassis comprises a reflecting groove which is concavely provided on a front surface of a reflecting member to reflect light, and the reflecting groove comprises a first reflecting surface which extends toward an upper front side around the printed circuit board in an inclined manner, and a pair of second reflecting surfaces which are provided on both sides around the printed circuit board and extend in front of both side ends in an inclined manner.

The pair of the second reflecting surfaces may include a plurality of grooves concavely formed as depressions.

The plurality of grooves may gradually become smaller in size from a region adjacent to a side end of the printed circuit board toward a region spaced apart from the printed circuit board.

The pair of the second reflecting surfaces may include a plurality of black dots.

The plurality of black dots may gradually become smaller in size from a region adjacent to a side end of the printed circuit board toward a region spaced apart from the printed circuit board.

BRIEF DESCRIPTION OF THE DRAWINGS

These and/or other aspects of the disclosure will become apparent and more readily appreciated from the following description of the exemplary embodiments, taken in conjunction with the accompanying drawings, in which.

DETAILED DESCRIPTION OF EXEMPLARY EMBODIMENTS

Figure 1:
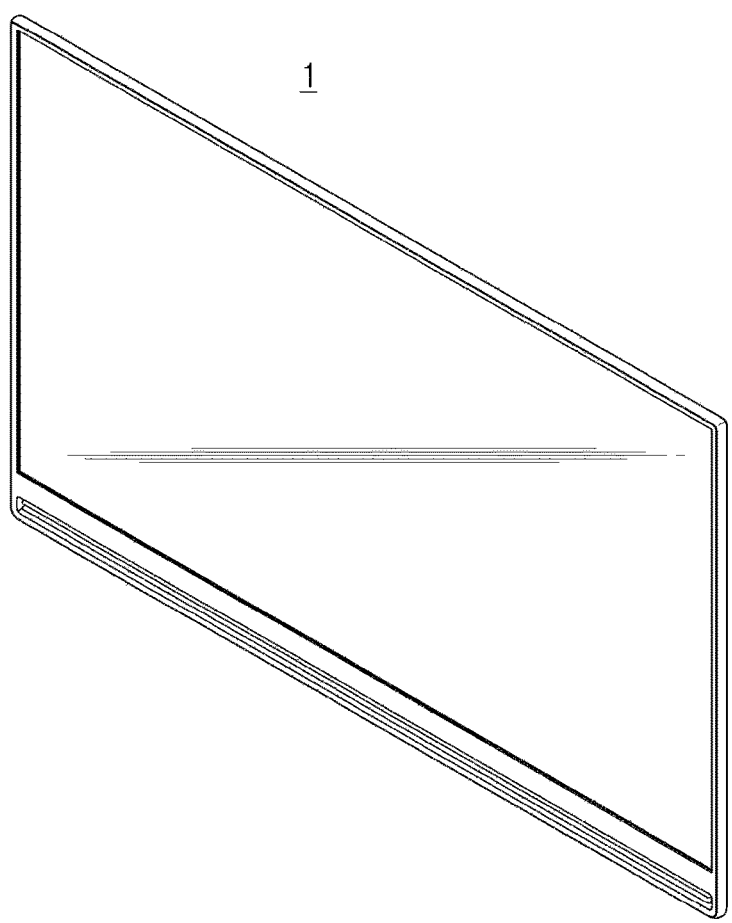
FIG. 1 is a perspective view of a display apparatus according to an exemplary embodiment.

As exemplary embodiments may be variously modified and have several forms, specific exemplary embodiments will be illustrated in the accompanying drawings and be described in detail in the written description. However, it is to be appreciated that this is not intended to limit the exemplary embodiments, but includes all equivalents, substitutions, and modifications without departing from the scope and spirit of the exemplary embodiments. Also, well-known functions or constructions are not described in detail since they would obscure the disclosure with unnecessary detail.

Hereinafter, exemplary embodiments will be described in detail with reference to the accompanying drawings. Like reference numerals in the drawings refer to like elements, and redundant descriptions are omitted.

Terms used herein explain the exemplary embodiments but are not intended to restrict and/or limit the present disclosure. Singular expressions, unless defined otherwise in context, include plural expressions. Throughout the specification, the terms "comprise," "have," etc. are used to specify the presence of stated features, numbers, steps, operations, elements, components or combinations thereof but do not preclude the presence or addition of one or more other features, numbers, steps, operations, elements, components, or combinations thereof.

The terms "first," "second," etc. may be used to describe various components, but these components are not limited by these terms. These terms are used only to distinguish one component from another. For example, without departing from the scope of the exemplary embodiment, a first component may be referred to as a second component, and similarly, a second component may be referred to as a first component. The term "and/or" includes any and all combinations of one or a plurality of associated listed items.

Hereinafter, exemplary embodiments will be described in detail with reference to the attached drawings.

Figure 2:
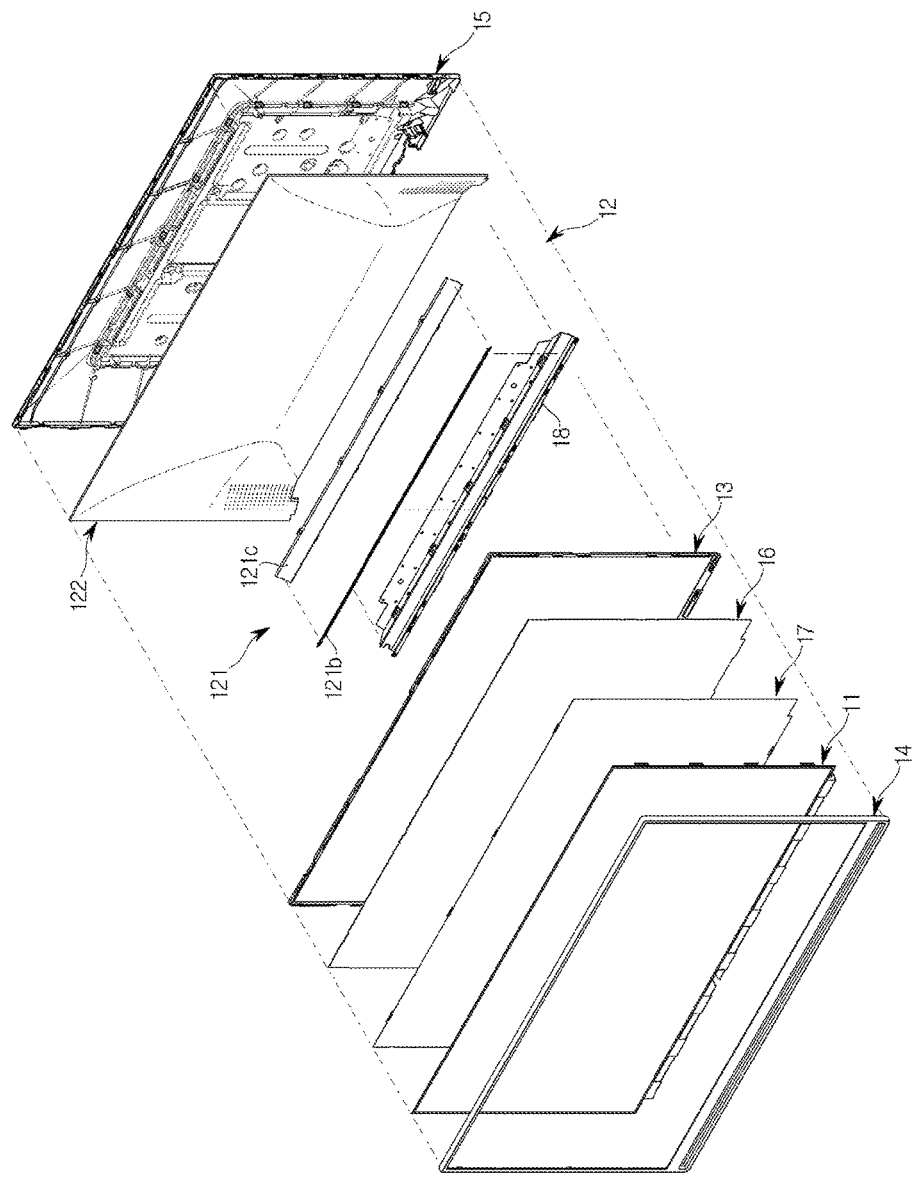
FIG. 2 is an exploded perspective view of a display apparatus according to the exemplary embodiment.
Figure 3:
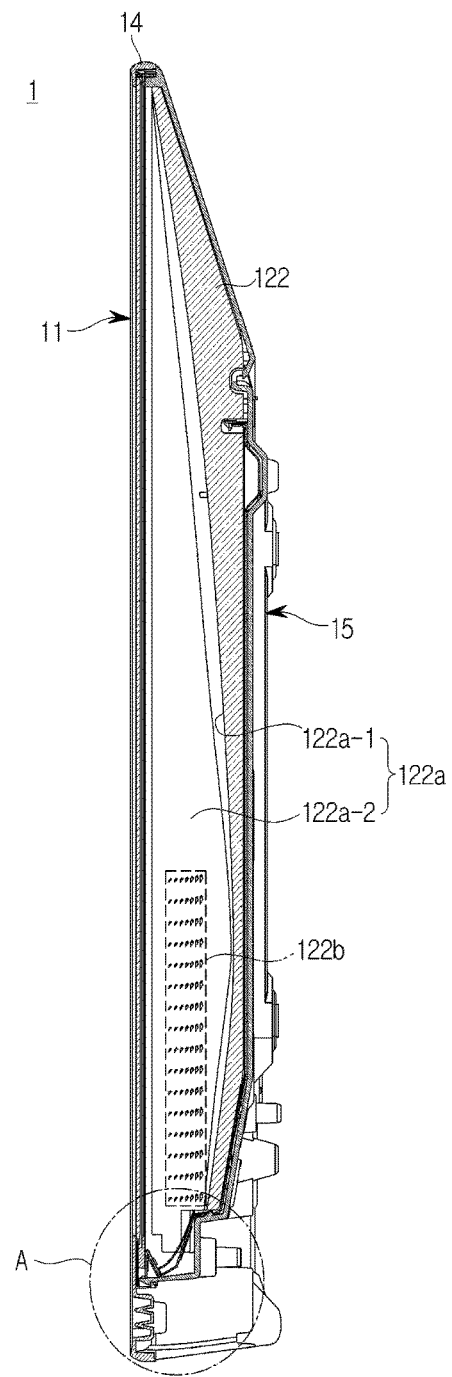
FIG. 3 is a cross-sectional view of the display apparatus according to the exemplary embodiment.
Figure 4:
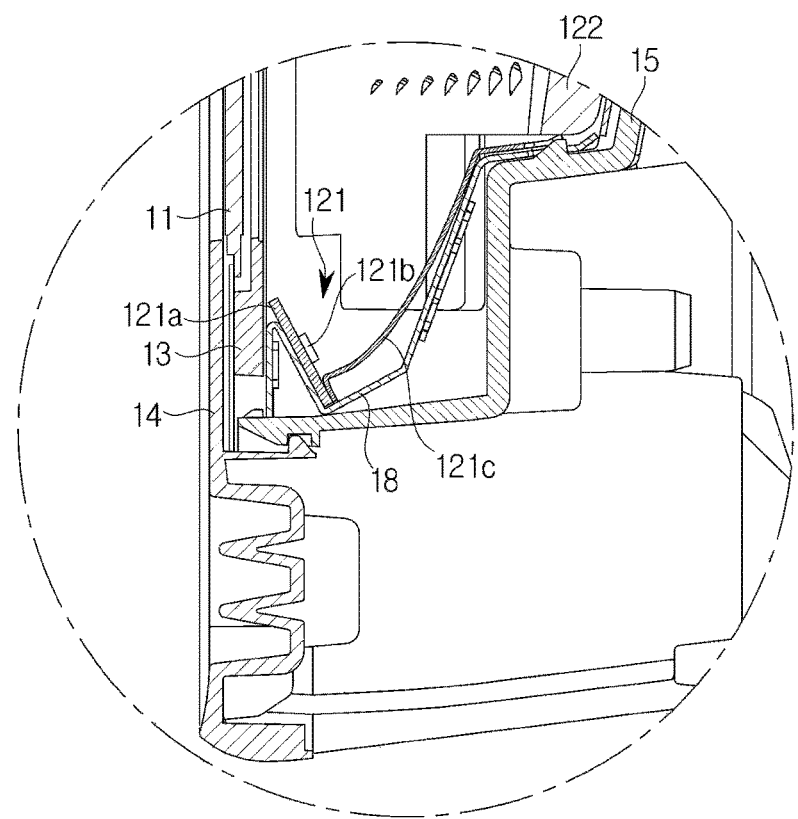
FIG. 4 is an enlarged view of portion A in FIG. 3.
Figure 5:
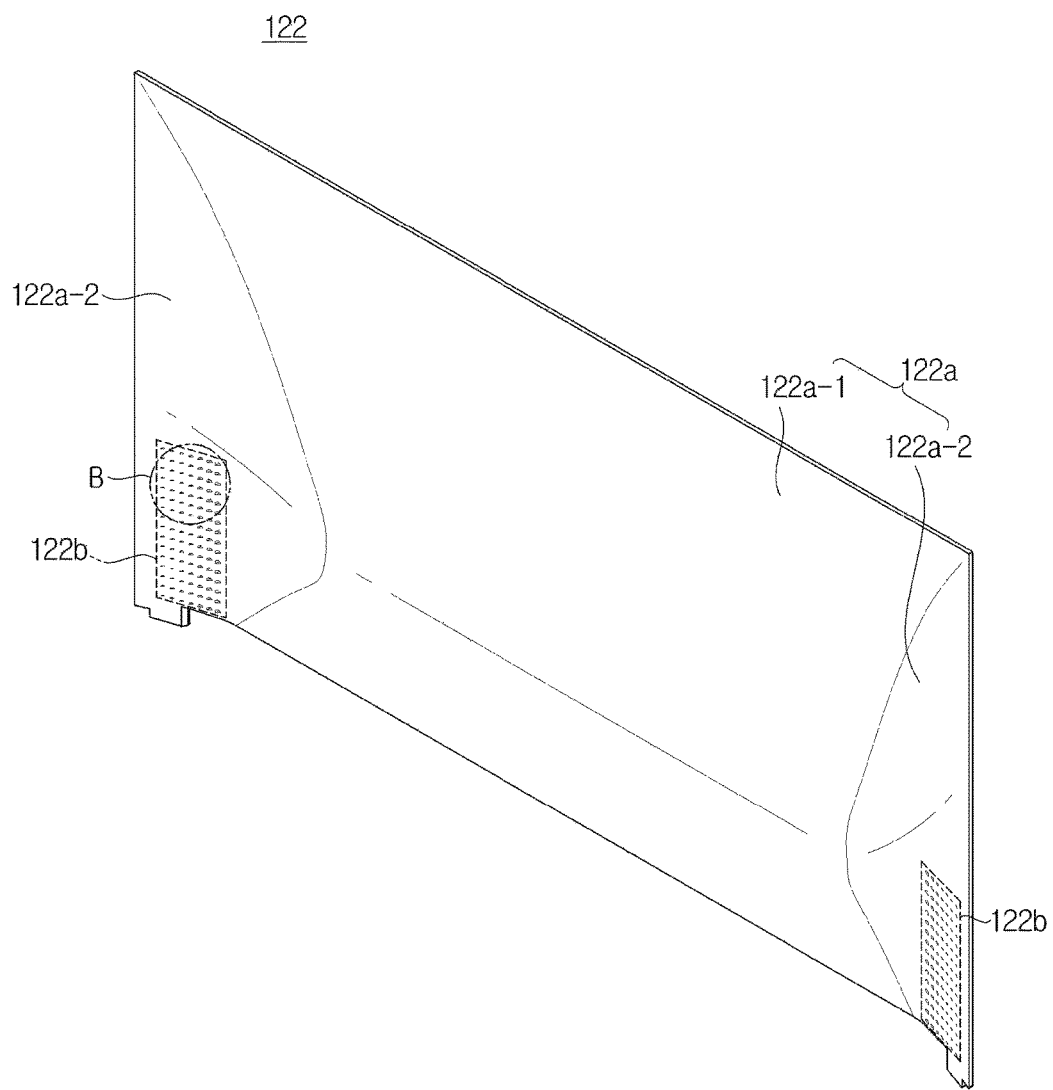
FIG. 5 is a perspective view of a reflecting member according to the exemplary embodiment.

FIG. 1 is a perspective view of a display apparatus in accordance with an exemplary embodiment, FIG. 2 is an exploded perspective view of the display apparatus in accordance with an exemplary embodiment, FIG. 3 is a lateral cross-sectional view of the display apparatus in accordance with an exemplary embodiment, and FIG. 4 is a cross-sectional view of an installed state of a light source in an exemplary embodiment. Further, FIG. 5 is a perspective view of a reflecting member applied to the display apparatus in accordance with an exemplary embodiment.

A display apparatus 1 in accordance with an exemplary embodiment may include a display panel 11 which forms a screen, and a backlight 12 which is disposed behind the display panel 11 spaced apart therefrom to supply light to the display panel 11.

The display apparatus 1 may further include a middle mold 13 which supports the display panel 11, a top chassis 14 which enables the display panel 11 to remain supported at a front side of the middle mold 13, and a bottom chassis 15 which accommodates the backlight 12 and is combined with the middle mold 13 such that the backlight 12 remains disposed behind the middle mold 13.

The display panel 11 comprises a liquid crystal panel which is formed by sealing a liquid crystal (not shown) provided between two glass substrates (not shown) which are each provided with electrodes.

The top chassis 14 and the middle mold 13 may be a square ring shape through which light supplied from the backlight 12 may pass such that an outer perimeter side of the display panel 11 between the top chassis 14 and the middle mold 13 is supported.

The bottom chassis 15 which is disposed to accommodate the backlight 12 and to cover a rear side of the backlight 12 prevents light generated from the backlight 12 to leak to the rear side. In the exemplary embodiment, the bottom chassis 15 and the top chassis 14 serve as a case to form an external shape of the display apparatus 1.

A diffusion member 16 for diffusing light supplied from the backlight 12 and an optical sheet 17 disposed in front of the diffusion member 16 to improve optical properties of light delivered through the diffusion member 16 are disposed between the display panel 11 and the backlight 12.

The diffusion member 16 may be a square plate shape to correspond to the display panel 11 and comprise a white translucent material to diffuse light.

The optical sheet 17 serves to gather light which is diffused while passing through the diffusion member 16 at an angle within a certain range and supplied to the display panel 11. In the exemplary embodiment, the optical sheet 17 may be a single sheet, but is not limited thereto, and a plurality of overlapping optical sheets may be disposed in order to improve properties of light.

The backlight 12 may include a light source 121 which generates light, and a reflecting member 122 which is disposed to cover an internal surface of the bottom chassis 15 and reflects light to a side of the diffusion member 16 located on a front side.

The light source 121 is disposed in a lower portion inside the bottom chassis 15 and includes a printed circuit board 121a, light emitting diodes 121b which are disposed on the printed circuit board 121a to generate light, and a reflector 121c which reflects the light generated from the light emitting diodes 121b to be dispersed. In the exemplary embodiment, the light source 121 is installed in the bottom chassis 15 through a bracket 18 installed in the lower portion inside the bottom chassis 15.

The printed circuit board 121a may be a square bar shape that extends in a lateral direction, and the light emitting diodes 121b are disposed on the printed circuit board 121a spaced apart from each other in a lateral direction.

The reflector 121c extends toward an upper rear side in an inclined manner from a location at which the printed circuit board 121a is installed. In the exemplary embodiment, the reflector 121c extends and is formed to have an arcuate cross-section such that the light reflected via the reflector 121c is efficiently diffused.

The reflecting member 122 is accommodated inside the bottom chassis 15 and forms a reflecting groove 122a such that a front surface thereof is concavely depressed to a rear side to reflect light to the diffusion member 16 in front thereof. The reflecting groove 122a may include a first reflecting surface 122a-1 which extends toward an upper front side in an inclined manner around a region in which the light source 121 is located, and a pair of second reflecting surfaces 122a-2 which are provided on both sides of the first reflecting surface 122a-1 and extend in front of both side ends in an inclined manner from the region in which the light source 121 is located, that is, a lower portion inside of the reflecting member 122.

In the exemplary embodiment, the reflecting member 122 is formed of a foam resin, and therefore, a first reflecting surface 122a-1, second reflecting surfaces 122a-2, and a connecting region of the first reflecting surface 122a-1 and the second reflecting surfaces 122a-2 which form the reflecting groove 122a may be manufactured in curved surfaces. That is, the reflecting member 122 is manufactured by injecting a resin inside a cavity of a molding die. Therefore, by precisely designing an internal shape of the cavity of the molding die, a shape of each region of the reflecting groove 122a may be designed and produced to obtain optimal light diffusion effects. In the exemplary embodiment, each of the first reflecting surface 122a-1 and the second reflecting surfaces 122a-2 may be an aspherical curved surface to disperse and reflect light to a front side.

In the exemplary embodiment, the reflecting member 122 is formed of a foam resin such as expandable polystyrene, etc. The foam resin is a white translucent material. Therefore, some incident light is reflected from a surface of the reflecting member 122 formed of the foam resin. The rest of the incident light enters the reflecting member 122, is diffused by the reflecting member 122, and is then emitted from the reflecting member 122. In other words, the reflecting member 122 formed of a foam resin may simultaneously perform reflection and diffusion of light.

Further, in the display apparatus 1, due to a location at which the light source 121 is disposed and a shape of the reflecting groove 122a, relatively larger amounts of light are inevitably delivered to some regions than to other regions. Therefore, a relatively larger amount of light is supplied to both sides of a lower portion of the display panel 11 than to other regions, which may generate brighter portions on the display panel 11.

Figure 6:
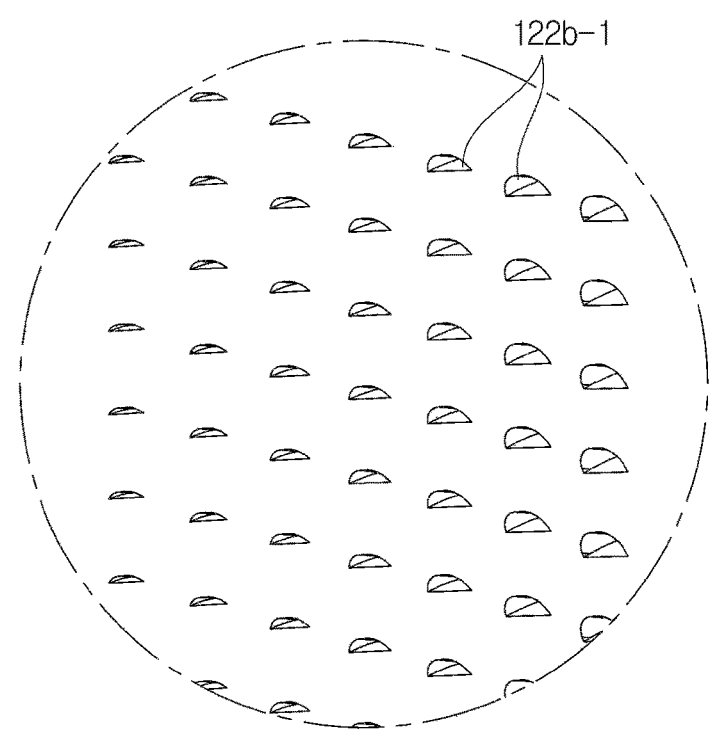
FIG. 6 is an enlarged view of portion B in FIG. 5.

Therefore, as shown in FIG. 6, a light absorbing part 122b is provided on each of the second reflecting surfaces 122a-2 such that the light absorbing part 122b absorbs some light supplied to the second reflecting surfaces 122a-2 and reduces the amount of the light delivered to the side of the display panel 11.

The light absorbing part 122b includes a plurality of grooves 122b-1 which are concavely provided on the second reflecting surfaces 122a-2. Here, sizes of the grooves 122b-1 gradually become smaller from a region adjacent to the light source 121 toward a region spaced apart from the light source 121, because larger amounts of light are transferred to regions closer to the light source 121 and smaller amounts of light are transferred to regions farther from the light source 121.

Next, operations of the display apparatus according to the exemplary embodiment will be described in detail with reference to the drawings.

When a power is supplied to the light emitting diodes 121b through the printed circuit board 121a, light is generated from the light emitting diodes 121b.

A portion of the light generated from the light emitting diodes 121b is delivered to an upper portion of the diffusion member 16 without change, and another portion of the light is directly delivered to the first reflecting surface 122a-1 of the reflecting member 122. Further, the rest of the light is reflected by the reflector 121c and delivered to lower and central portions of the diffusion member 16. A portion of the light delivered to the first reflecting surface 122a-1 is reflected without change by an internal surface of the reflecting groove 122a and delivered to a rear surface of the diffusion member 16. Another portion of the light enters the reflecting member 122 by passing through the first reflecting surface 122a-1, is diffused inside the reflecting member 122, and is then emitted from the first reflecting surface 122a-1 again and delivered to the rear surface of the diffusion member 16.

Further, a portion of light generated from two light emitting diodes 121b disposed on both ends of the printed circuit board 121a among the light emitting diodes 121b is incident on the second reflecting surface 122a-2. The light absorbing part 122b including the grooves 122b-1 is provided on the second reflecting surface 122a-2, and therefore, a portion of light transferred to the second reflecting surface 122a-2 is absorbed by the light absorbing part 122b. The rest of the light is reflected from a surface of the second reflecting surface 122a-2, or enters and is diffused from the reflecting member 122 through the second reflecting surface 122a-2, and is then emitted and delivered to a side of the diffusion member 16.

As described above, the light generated from the light emitting diodes 121b is dispersed via various paths and delivered to the rear surface of the diffusion member 16. After the light incident on the rear surface of the diffusion member 16 is diffused by the diffusion member 16, the light passes through the optical sheet 17 and is delivered to the display panel 11. Therefore, light with even light distribution may be delivered to the entire display panel 11.

Figure 7:
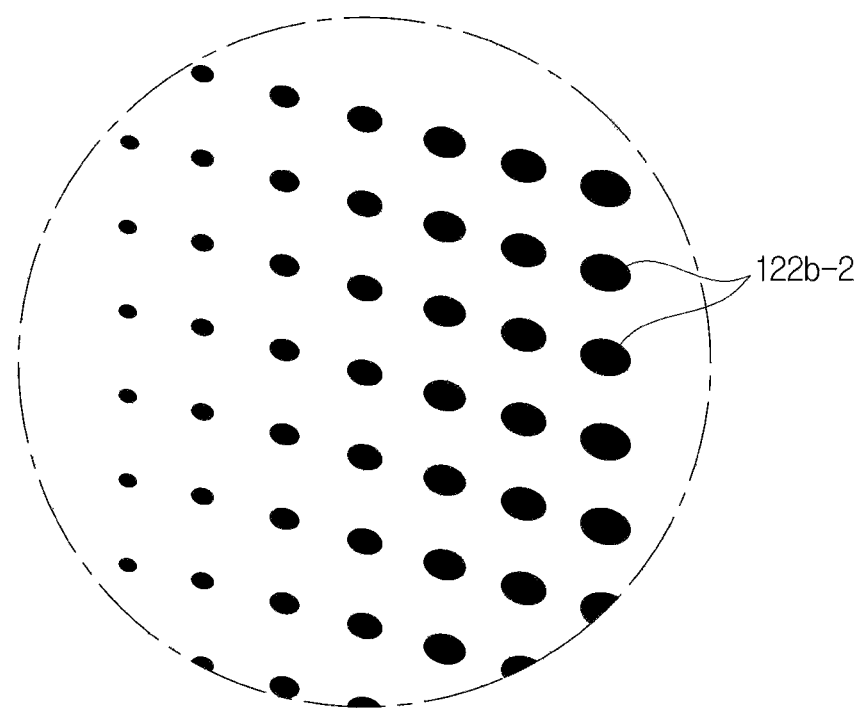
FIG. 7 is an enlarged view of a light absorbing part of the reflecting member according to another exemplary embodiment.

In the exemplary embodiment, the light absorbing part 122b includes the grooves concavely provided on the second reflecting surfaces 122a-2, but is not limited thereto, and as shown in FIG. 7, dots 122b-2 which are formed in black to absorb light may be provided on the second reflecting surfaces 122a-2.

In this case, the black dots 122b-2 are formed to become gradually smaller in size from a region adjacent to a side end of the printed circuit board 121a toward a region spaced apart from the printed circuit board 121a.

Figure 8:
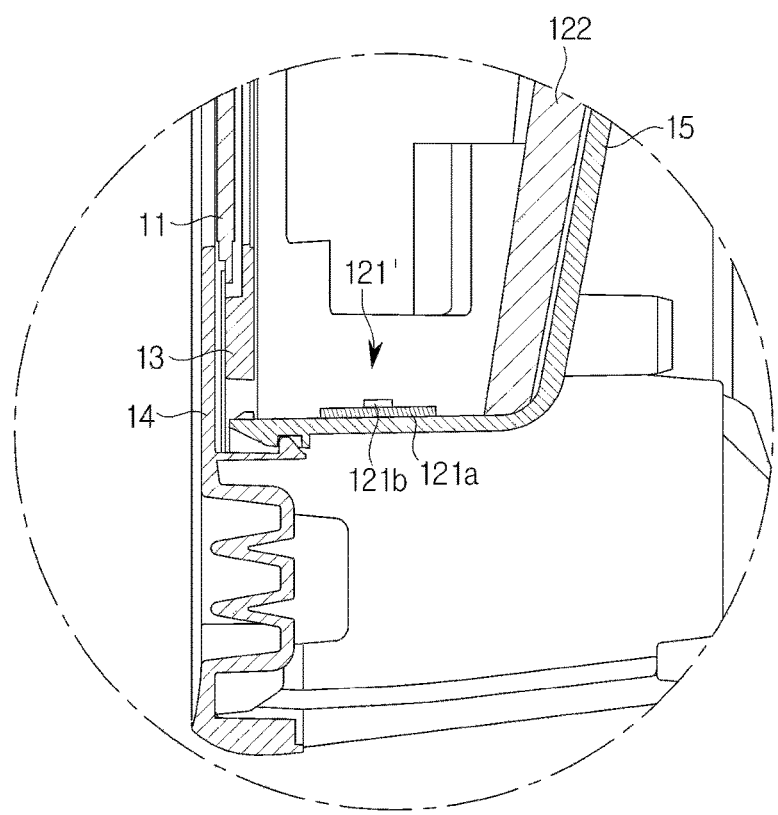
FIG. 8 is an enlarged view of a light source according to another exemplary embodiment.

In the exemplary embodiment, although the light source 121 includes the reflector 121c, but is not limited thereto, and the reflector 121c may be provided to diffuse light at a wider variety of angles. Referring to FIG. 8, while the light source 121' may include only the printed circuit board 121a and the light emitting diodes 121b, an installation angle of the light source 121' may be adjusted such that most of the light generated from the light emitting diodes 121b is radiated to the reflecting member 122, and only a portion of light is delivered to the side of the diffusion member 16.

In the exemplary embodiment, the reflecting member 122 may be manufactured separately from the bottom chassis 15 and installed inside the bottom chassis 15, but is not limited thereto, and the bottom chassis may be used as a reflecting member because the bottom chassis is formed of a foam resin.

That is, the bottom chassis is formed of a white foam resin, and the reflecting groove having a first reflecting surface and second reflecting surfaces is formed on a front surface of the bottom chassis.

In this case, the bottom chassis should have a high density and be thick enough to prevent light from passing therethrough.

In the exemplary embodiment, the light source 121 may include a printed circuit board 121a and light emitting diodes 121b, but is not limited thereto, and various kinds of light emitting diodes may be used as a light source.

The above-described display apparatus may include a reflecting member formed of a foam resin so that light is not only reflected but also diffused by the reflecting member, thereby being supplied in a more uniform light distribution to a display panel.

Further, since the display apparatus in accordance with exemplary embodiment may include a reflecting member formed of a foam resin, a first reflecting surface, second reflecting surfaces, and a connecting region of the first reflecting surface and the second reflecting surfaces which form a reflecting groove may be manufactured in curved surfaces.

Although a few exemplary embodiments have been shown and described, it would be appreciated by those skilled in the art that changes may be made in the exemplary embodiments without departing from the principles and spirit of the disclosure, the scope of which is defined in the claims and their equivalents.

What is claimed is:

1. A display apparatus comprising:
   a display panel comprising a front side, facing a first direction, and a rear side, facing a second direction;
   a light source disposed in the second direction with respect to the rear side of the display panel, on a lower portion of the display panel, wherein the light source is positioned such that it radiates light upward and in the second direction, in an inclined manner, such that the light radiated from the light source is directed away from the rear side of the display panel; and
   a reflecting member disposed in the second direction with respect to the rear side of the display panel and comprising a white foam resin;
   wherein the reflecting member comprises:
      a first reflecting surface, substantially facing the first direction,
      a pair of second reflecting surfaces which are provided on both sides of the first reflecting surface and extend in front of the first reflecting surface in an inclined manner; and
      a light absorbing part, disposed on each of the pair of second reflecting surfaces, and configured to absorb some light incident on the pair of second reflecting surfaces.

2. The display apparatus according to claim 1, wherein: the first reflecting surfaces comprises a reflecting groove which is concavely provided on a front surface of the first reflecting surface to reflect light radiated from the light source.

3. The display apparatus according to claim 2, wherein the light source comprises:
   a printed circuit board which has a bar shape and is disposed lengthwise in a horizontal direction on the rear side of the lower portion of the display panel; and
   a plurality of light emitting diodes disposed on the printed circuit board.

4. The display apparatus according to claim 3, wherein:
   the first reflecting surface extends toward an upper front side around the printed circuit board in an inclined manner; and
   the pair of second reflecting surfaces are provided on both sides around the printed circuit board.

5. The display apparatus according to claim 1, wherein the light absorbing part comprises a plurality of grooves concavely formed as depressions in each of the pair of the second reflecting surfaces.

6. The display apparatus according to claim 5, wherein the light source comprises a printed circuit board which has a bar shape and is disposed lengthwise in a horizontal direction on the rear side of the lower portion of the display panel, and a plurality of light emitting diodes disposed on the printed circuit board; and
   wherein the plurality of grooves gradually become smaller in size from a region adjacent to a side end of the printed circuit board toward a region spaced apart from the printed circuit board.

7. The display apparatus according to claim 1, wherein the light absorbing part comprises a plurality of black dots provided on the pair of the second reflecting surfaces.

8. The display apparatus according to claim 7, wherein
   the light source comprises a printed circuit board which has a bar shape and is disposed lengthwise in a horizontal direction on the rear side of the lower portion of the display panel, and a plurality of light emitting diodes disposed on the printed circuit board; and
   the plurality of black dots gradually become smaller in size from a region adjacent to a side end of the printed circuit board toward a region spaced apart from the printed circuit board.

9. The display apparatus according to claim 1, further comprising:
   a middle mold configured to support an outer perimeter of the display panel;
   a top chassis combined with a front side of the middle mold; and
   a bottom chassis combined with the rear side of the middle mold,
   wherein the reflecting member is disposed inside the bottom chassis.

10. The display apparatus according to claim 1, further comprising:
    a middle mold configured to support an outer perimeter of the display panel; and
    a top chassis combined with a front side of the middle mold,
    wherein the reflecting member forms a bottom chassis to be combined with the rear side of the middle mold.

11. The display apparatus according to claim 3, wherein the light source further comprises a reflector configured to reflect light radiated from the light emitting diodes, and the reflector extends toward an upper rear side of the light emitting diodes in an inclined manner.

12. The display apparatus according to claim 11, wherein the reflector is configured to extend in an arcuate shape.

13. A display apparatus comprising:
    a display panel comprising a front side, facing a first direction, and a rear side, facing a second direction;
    a light source disposed in the second direction with respect to the rear side of the display panel, on a lower portion of the display panel, wherein the light source is positioned such that it radiates light upward and in the second direction, in an inclined manner, such that the light radiated from the light source is directed away from the rear side of the display panel; and
    a bottom chassis which accommodates the light source and comprises a white foam resin;
    wherein the bottom chassis comprises:

a first reflecting surface, substantially facing the first direction, and a pair of second reflecting surfaces which are provided on both sides of the first reflecting surface and extend in front of the first reflecting surface in an inclined manner, and a light absorbing part disposed on each of the pair of second reflecting surfaces and configured to absorb come light incident on the pair of second reflecting surfaces.

14. The display apparatus according to claim 13, wherein the light source comprises:

a printed circuit board; and a plurality of light emitting diodes disposed on the printed circuit board.

15. The display apparatus according to claim 14, wherein:

the printed circuit board is formed in a bar shape and disposed lengthwise in a horizontal direction on the rear side of the lower portion of the display panel.

16. The display apparatus according to claim 15, wherein the light absorbing part comprises a plurality of grooves concavely formed as depressions.

17. The display apparatus according to claim 16, wherein the plurality of grooves gradually become smaller in size from a region adjacent to a side end of the printed circuit board toward a region spaced apart from the printed circuit board.

18. The display apparatus according to claim 15, wherein the light absorbing part comprises a plurality of black dots.

19. The display apparatus according to claim 18, wherein the plurality of black dots gradually become smaller in size from a region adjacent to a side end of the printed circuit board toward a region spaced apart from the printed circuit board.

* * * * *